(12) United States Patent
Zhang et al.

(10) Patent No.: US 10,295,685 B2
(45) Date of Patent: May 21, 2019

(54) GENERATING COMMON IMAGE GATHER USING WAVE-FIELD SEPARATION

(71) Applicant: Saudi Arabian Oil Company, Dhahran (SA)

(72) Inventors: Dongliang Zhang, Dhahran (SA); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 100 days.

(21) Appl. No.: 15/480,708

(22) Filed: Apr. 6, 2017

(65) Prior Publication Data

US 2018/0292554 A1 Oct. 11, 2018

(51) Int. Cl.
*G06F 19/00* (2018.01)
*G01V 1/30* (2006.01)
(Continued)

(52) U.S. Cl.
CPC ............... *G01V 1/303* (2013.01); *G01V 1/32* (2013.01); *G01V 1/28* (2013.01); *G01V 1/36* (2013.01); *G01V 2210/48* (2013.01)

(58) Field of Classification Search
CPC ......... G01V 1/28; G01V 2210/32; G01V 1/36
(Continued)

(56) References Cited

U.S. PATENT DOCUMENTS

| 9,128,205 B2 | 9/2015 | Guan et al. | |
|---|---|---|---|
| 2014/0149046 A1* | 5/2014 | Baina | G01V 1/282 |
| | | | 702/14 |

(Continued)

FOREIGN PATENT DOCUMENTS

| GB | 2483997 | 3/2012 |
|---|---|---|
| WO | WO2016156530 A1 | 10/2016 |

OTHER PUBLICATIONS

Hu et al., "Angle gathers from reverse time migration using analytic wavefield propagation and decomposition in the time domain," Geophysics vol. 81, No. 1, Jan. 1, 2016, 9 pages.
(Continued)

*Primary Examiner* — Edward Raymond
(74) *Attorney, Agent, or Firm* — Fish & Richardson P.C.

(57) ABSTRACT

The present disclosure describes methods and systems, including computer-implemented methods, computer program products, and computer systems, for generating Angle Domain Common Image Gathers (ADCIGs). One computer-implemented method includes receiving, at a data processing apparatus, a set of seismic data associated with a subsurface region wherein the set of seismic data includes receiver signal data at a plurality of time steps; for each time step in the plurality of time steps: calculating a receiver wavefield based on the receiver signal data at the respective time step; separating a first direction receiver wavefield and a second direction receiver wavefield of the receiver wavefield using Hilbert transformation of the receiver signal data at the respective time step; and applying an optical flow process on the first direction receiver wavefield to calculate wavefield directions; and generating an Angle Domain Common Image Gather (ADCIG) based on the wavefield directions.

7 Claims, 10 Drawing Sheets
(6 of 10 Drawing Sheet(s) Filed in Color)

(51) Int. Cl.
*G01V 1/32* (2006.01)
*G01V 1/36* (2006.01)
*G01V 1/28* (2006.01)

(58) Field of Classification Search
USPC ...................................... 702/182–185, 6, 13
See application file for complete search history.

(56) References Cited

U.S. PATENT DOCUMENTS

| | | |
|---|---|---|
| 2014/0293744 A1 | 10/2014 | Zhang |
| 2015/0112601 A1* | 4/2015 | Ozbek ................... G01V 1/003 702/14 |

OTHER PUBLICATIONS

Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.

International Search Report and Written Opinion issued in International Application No. PCT/US2018/026071 dated Jul. 9, 2018, 15 pages.

Fei et al., "An Endemic Problem in Reverse-Time Migration," 84th Annual International Meeting, SEG, Expanded Abstracts, published in 2014, pp. 3811-3815.

Fei et al., Removing False Images in Reverse Time Migration: The Concept of De-Primary,: Geophysics, 80, No. 6, Nov.-Dec. 2015, pp. S237-S244.

Fomel, "Theory of 3-D Angle Gathers in Wave-Equation Imaging," 74th Annual International Meeting, SEG, Expanded Abstracts, Oct. 2004, pp. 1053-1056.

Liu et al., "An Effective Imaging Condition for Reverse-Time Migration using Wavefield Decomposition," Geophysics, 76, No. 1, Jan.-Feb. 2011, pp. S29-S39.

Sava et al. "Angle-Domain Common Image Gathers by Wavefield Continuation Methods," Geophysics, 68, May-Jun. 2003, pp. 1065-1074.

Xu et al., "3D Angle Gathers from Reverse-Time Migration," Geophysics, 76, No. 2, Mar.-Apr. 2011, pp. S77-S92.

Zhang, "RTM Angle Gathers and Specular Filter (SF) RTM using Optical Flow," 84rd Annual International Meeting, SEG, Expanded Abstracts, Copyright 2014, pp. 3816-3820.

* cited by examiner

502
receiving, at a data processing apparatus, a set of seismic data associated with a subsurface region, wherein the set of seismic data includes receiver signal data at a plurality of time step

504
for each time step in the plurality of time steps, calculating, by the data processing apparatus, a receiver wavefield based on the receiver signal data at the respective time step

506
separating, by the data processing apparatus, a first direction receiver wave and a second direction receiver wave of the receiver wavefield using Hilbert transformation of the receiver signal data at the respective time step

508
calculating migration directions at the plurality of time steps based on the first direction receiver waves

510
generating, by the data processing apparatus, a subsurface image based on the migration directions

GENERATING COMMON IMAGE GATHER USING WAVE-FIELD SEPARATION

TECHNICAL FIELD

This disclosure relates to generating common image gathers of subsurface structures.

BACKGROUND

In a geophysics analysis, common image gathers of the subsurface structure for a geographic area can be generated. The common image gathers can be used to build velocity model of the subsurface structure.

SUMMARY

The present disclosure describes methods and systems, including computer-implemented methods, computer program products, and computer systems for generating subsurface common image gathers. One computer-implemented method for generating subsurface common image gathers includes receiving, at a data processing apparatus, a set of seismic data associated with a subsurface region, wherein the set of seismic data includes receiver signal data at a plurality of time steps; for each time step in the plurality of time steps: calculating, by the data processing apparatus, a receiver wavefield based on the receiver signal data at the respective time step; separating, by the data processing apparatus, a first direction receiver wavefield and a second direction receiver wavefield of the receiver wavefield using Hilbert transformation of the receiver signal data at the respective time step; and applying, by the data processing apparatus, an optical flow process on the first direction receiver wavefield to calculate wavefield directions; and generating, by the data processing apparatus, an Angle Domain Common Image Gather (ADCIG) based on the wavefield directions.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, wherein the first direction receiver wavefield is downgoing and the second direction receiver wave is up-going.

A second aspect, combinable with any of the previous aspects, wherein the first direction receiver wave is at least one of left-going or right-going.

A third aspect, combinable with any of the previous aspects, wherein the set of seismic data further includes source signal data at the plurality of time steps, the method further comprising: for each time step in the plurality of time steps: calculating, by the data processing apparatus, a source wavefield based on the source signal at the respective time step; separating, by the data processing apparatus, a first direction source wavefield and a second direction source wavefield of the source wavefield using Hilbert transformation of the source signal data at the respective time step; and applying, by the data processing apparatus, a second optical flow process on the first direction source wavefield to calculate source wavefield directions; and wherein the ADCIG is generated further based on the source wavefield directions.

A fourth aspect, combinable with any of the previous aspects, wherein generating the ADCIG comprises: calculating a half opening angle based on the wavefield directions; and generating the ADCIG by binning and summing images based on the half opening angle.

A fifth aspect, combinable with any of the previous aspects, wherein separating the first direction receiver wavefield and the second direction receiver wavefield comprising solving $H_t(P)$ based on an equation:

$$\Delta H_t(P) = \frac{1}{v} \frac{\partial^2 H_t(P)}{\partial t^2} + H_t[f(t)],$$

wherein P represents the receiver wavefield, $H_t(P)$ represents a Hilbert transform of the receiver wavefield, v represents a velocity model, t represents a time step, and $f(t)$ represents a source function.

A sixth aspect, combinable with any of the previous aspects, further comprising: generating a seismic image based on the ADCIG.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

FIG. 5 illustrates an example generating common imaging gather using the wavefield separation algorithm according to an implementation.

DETAILED DESCRIPTION

Figure 1:
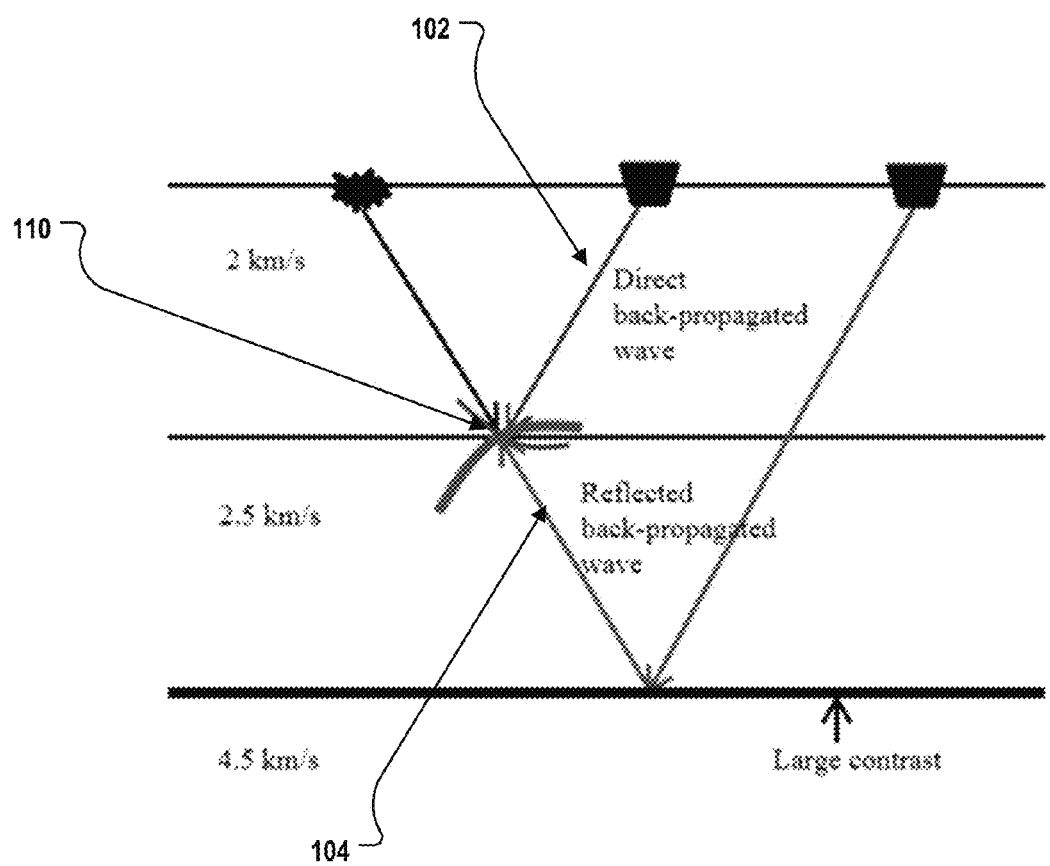
FIG. 1 illustrates an example three-layer velocity model according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for generating common image gathers for a subsurface structure in a geographic area. In a geophysics analysis, subsets of the whole image with fixed surface location can be displayed to measure variations between the partial images at fixed image points. These subsets of images are referred to as common image gathers (CIG), or common reflection points (CRP). If the partial images are function of the reflection angles, the corresponding CIGs are referred to as Angle Domain Common Image Gathers (ADCIGs).

In a geophysics analysis, common image gathers are used to build a velocity model of the subsurface structure in a geographic area, and the velocity model is used in generating images of the subsurface structure. The velocity model is an important factor that affects the quality of the image of the subsurface structure. Therefore, improving the quality of common image gather can improve the accuracy of the velocity model and in turns, provide better understanding of the subsurface structure and improve the efficiency of a hydrocarbon exploration or production operation in the geographic area.

In some cases, seismic signals can be transmitted into the subsurface of the earth at a source location by a source device. Examples of the seismic signals include acoustic signals. The seismic signals travel through the subsurface and can be received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted and reflected through the substructure, the characteristics of the received signals contain information of the substructure. The received signals can be analyzed to produce the CIGs of the subsurface structure.

In a marine survey, air guns and hydrophones can be used as the source devices and the receiver devices, respectively. During the acquisition, seismic sources are exploded from arrays of air guns. The reflected and refracted signals are acquired by streamers of hydrophones. In a land acquisition, dynamite can be used an explosive source and a geophone is employed as a receiver device. In another example, vibratory trucks can be used as source devices. Other devices that generate and receive seismic signals can also be used.

The angle domain common image gathers (ADCIG) is one kind of common image gather which can be used for amplitude variation with angle analysis, migration velocity quality control and migration velocity analysis. When the migration velocity is correct, the images from various incident angles focus on the same depth, thus generating flat events on the ADCIGs. In contrast, when the velocity has errors, the events in ADCIGs become non-flat. Measuring of residual moveout from the non-flat events can be used for estimating the migration velocity. Such velocity estimation can be carried out by using computer tomography algorithms. The estimated migration velocity can be used to refine the velocity model and determine the correct velocity for signal propagating through the substructure. With a correct velocity model, the images of the substructure can be generated based on the collected seismic signals by the receiver devices.

Along with the ever-growing computer capabilities, different migration algorithms can be used. For example, the ray-based and bean-based Kirchhoff methods were popular in practice due to their computational efficiency and target-oriented flexibility. Following that, the one-way and two-way wave-equation migrations were used broadly.

In some cases, reverse time migration (RTM) can be used in analysis migrations. The RTM algorithm includes calculations of forward propagation of the source wavefield, the backward propagation of the receiver wavefield, and the associated imaging condition between the two computed wavefields. In some cases, source wavefield and receiver wavefield can be referred to as forward wavefield and backward wavefield, respectively.

Using the two-way wave equation, RTM can generate images of the complex subsurface structure (subsalt), focus the steeply dipping events (salt flank area) and provide more accurate image amplitudes for seismic interpretation. Therefore, RTM ADCIGs can be used in the migration velocity analysis instead of one-way wave equation migration, Kirchhoff, or beam migration methods. Cost effective methods for making ADCIGs based on the advanced RTM technology will be useful for improving the efficiency of the subsurface analysis.

RTM ADCIG methods include two categories: the indirect and direct methods. The indirect method introduces an extended image condition to form the subsurface offset domain common image gathers (ODCIGs). The ODCIG are then converted to the ADCIGs by a slant stack process, which is often implemented in the frequency and wave-number domain to save computation costs. This method may lack of efficiency in processing 3-Dimentional (3D) data. In 3D, each ODCIGs is a 5-Dimentional (5D) array, including the 3D spatial coordinates (x,y,z) and the 2D subsurface offsets (hx, hy). Applying algorithms (for example Fast Fourier Transform) to the 5D array can be expensive and impractical. An alternative method that replaces the 2D (hx, hy) spatial-shift imaging condition with the 1-Dimentional (1D) time-shift imaging condition can be used. However, while the time-shifting imaging condition reduces the 5D array to 4-Dimential (4D) (x,y,z,τ), the 4D input may not generate the desired 5D ADCIG, which is a function of (x, y, z, angle, azimuth) variables.

A direct method for making the RTM ADCIGs is to decompose the source and receiver wavefields into local plane waves. The decomposed plane-wave components from the source and receiver wavefields are zero-lag correlated with each other, and a scalar value is outputted at each grid point in a 3D image column. The scalar values are binned according to their bisecting angles between the plane-wave directions of the two wavefields. An implementation to decompose the wavefields in the F-K domain can be used. This method includes storing the entire wavefields at every time step. The ADCIGs obtained from this decomposition method has high fidelity in the presence of noise. However, this approach consumes a lot of computational time and storage space. Another method uses Poynting vector (PV) to calculate the propagation direction of the wavefront by using the first order spatial and temporal derivatives. Compared to the F-K decomposition method, the PV method is inexpensive and efficient. However, this method may be unstable when the wavefields become complex. To improve the PV method, the optical flow can be used. The optical flow includes an iterative approach while PV acts its first iteration. By introducing regularization, the optical flow can compute more reliable and accurate wave propagation directions.

Both PV and optical flow methods can obtain only one propagation direction at each grid point on a specific time step. In many circumstances, the single-direction assumption is invalid, thus both PV and conventional optical flow methods may encounter severe problems. FIG. 1 illustrates an example three-layer velocity model according to an implementation. As shown in FIG. 1, the back-propagated wave 102 from the first-interface reflection and the reflected wave 104 from second-interface reflection may arrive at the same location 110 at the same time. Due to the large contrast at the second interface, the energy of reflected back-propagated wave 104 may override the direct back-propagated wave 102, which yields the wrong up-going propagation direction for the angle gather. Therefore, the interference of the two arrivals may lead to wrong computation propagation angle for the first-interface reflection, thus binning the wrong angles for the ADCIGs.

The problem illustrated in FIG. 1 may be addressed by separating the wavefield into up-going and down-going waves. Incident angles can be calculated on the separated down going wavefields. The conventional Fourier transform or Hilbert transform can be used to separate wavefields. Optical flow process can be applied on the separated down going wavefields instead of the combined down going and up going wavefields. However, these transform calculations may require storing the entire wavefields of all-time steps.

In some cases, the wavefields can be separated into up-going and down-going waves without saving the entire wavefields of all time steps. The source and receiver wavefields and their Hilbert transformations may be processed simultaneously, followed by applying the Hilbert transform in depth dimension on these wavefields to achieve the wavefield decomposition. This approach stores two wavefields at a single time step, and achieves similar results of storing the whole wavefields on all time steps. The memory savings provided by this approach may be in the order of a few thousand.

Optical flow is a computer implemented method to resolve the apparent motions between successive image frames. It can also be applied to a sequence of wavefields for calculating the propagation directions of wavefields. The seismic optical flow algorithm is defined as following: given two successive wavefields $P(x, z, t_1)$ and $P(x, z, t_2)$, find the motion vector $\vec{v}(x, z)$ from $P(x, z, t_1)$ to $P(x, z, t_2)$. Here, $\vec{v}(x, z)=(u, w)$ is the propagation direction of wavefields at each point, where u, w represent the x and z components of the motion vector respectively. The motion vector (propagation direction) is controlled by equation:

$$P_x u + P_z w + P_t = 0. \quad (1)$$

Where, $P_x$, $P_z$ and $P_t$ are the partial derivative with respect to x, z, and t, respectively. Using the $L_2$ norm misfit function with smoothing regularization to optimize equation 1, the iterative solution is $$u^{n+1} = \bar{u}^n - \frac{P_x(P_x \bar{u}^n + P_z \bar{w}^n + P_t)}{\alpha^2 + P_x^2 + P_z^2}, \quad (2)$$

$$w^{n+1} = \bar{w}^n - \frac{P_z(P_x \bar{u}^n + P_z \bar{w}^n + P_t)}{\alpha^2 + P_x^2 + P_z^2}. \quad (3)$$

Where, $\bar{u}$ and $\bar{w}$ are local spatially smoothed values of u and w respectively. The superscript n and n+1 indicate the iteration number and $\alpha$ is the weighting factor. Equations (A-1) to (A-10) and associated descriptions provide some additional details of the iterative solutions.

In the (x, z, t) domain, a point at location (x, z) with wavefield P(x, z, t) will move by $\Delta x$, $\Delta z$ after the time interval $\Delta t$, and the following wavefield constancy constraint is given:

$$P(x,z,t)=P(x+\Delta x, z+\Delta z, t+\Delta t). \quad (A-1)$$

Assuming the movement to be small, the wavefield at P(x, z, t) can be expanded using a Taylor series:

$$P(x+\Delta x, z+\Delta z, t+\Delta t)=P(x,z,t)+P_x \Delta x + P_z \Delta z + P_t \Delta t + H \cdot O \cdot T, \quad (A-2)$$

where, $P_x$, $P_z$, and $P_t$ are the partial derivative with respect to x, z and t. From equations A-1 and A-2, ignoring the higher order terms, it follows that:

$$P_x u + P_z w + P_t = 0. \quad (A-3)$$

where u and w are the velocity of motion in x and z directions which are defined as $$u = \frac{\Delta x}{\Delta t}, \; w = \frac{\Delta z}{\Delta t}. \quad (A-4)$$

In order to solve the under-determined equation (A-3) for u, w, an $L_2$ norm misfit function is used for minimization. To make the motion vector vary smoothly, a penalty function is appended to the objective function. The misfit function can be expressed as $$E=\iint[(P_x u+P_z w+P_t)^2+\alpha^2(\|\nabla u\|^2+\|\nabla w\|^2)]dxdz, \quad (A-5)$$

where $\alpha$ is the weighting factor and $\|\nabla\|^2$ is the dot product of the gradient defined as $$\|\nabla\|^2=(\partial/\partial_x)^2+(\partial/\partial_z)^2. \quad (A-6)$$

The iterative solution of equation (A-5) is thus as following $$u^{n+1} = \bar{u}^n - \frac{P_x(P_x \bar{u}^n + P_z \bar{w}^n + P_t)}{\alpha^2 + P_x^2 + P_z^2}, \quad (A-7)$$

$$w^{n+1} = \bar{w}^n - \frac{P_z(P_x \bar{u}^n + P_z \bar{w}^n + P_t)}{\alpha^2 + P_x^2 + P_z^2}, \quad (A-8)$$

where $\bar{u}$ and $\bar{w}$ are local spatially smoothed values of u and w respectively. The superscript n and n+1 indicate the iteration number and $\alpha$ is the weighting factor. The smoothing operator (average) is defined as $$\bar{u}_{i,j}=1/12(\Sigma_{ii=-1,0,1}\Sigma_{jj=-1,0,1}u_{i+ii,j+jj}+u_{i-1,j}+u_{i+1,j}+u_{i,j-1}+u_{i,j+1}-u_{i,j}), \quad (A-9)$$

$$\bar{w}_{i,j}=1/12(\Sigma_{ii=-1,0,1}\Sigma_{jj=-1,0,1}w_{i+ii,j+jj}+w_{i-1,j}+w_{i+1,j}+w_{i,j-1}+w_{i,j+1}-w_{i,j}), \quad (A-10)$$

Where, i and j are the spatial indices associated with the x and z axes, respectively. Equations (A-7) and (A-8) iteratively calculate the u and w values for all point at one time step. Likewise, for all time steps the propagation direction can be obtained.

Assuming the initial value of u and w is zero and α=0, the first iteration of equations 2 and 3 becomes the conventional Poynting vector $$u = -\frac{P_x P_t}{P_x^2 + P_z^2}, \quad (4)$$

$$w = -\frac{P_z P_t}{P_x^2 + P_z^2}. \quad (5)$$

Therefore, the Poynting vector is the first iteration of optical flow. Compared to Poynting vector, the optical flow method is more stable and accurate. The cost of this algorithm depends on the iteration number N. In this disclosure we use N=10 for the examples given. The empirical weighting factor α controls the smoothness of variation in the motion vector. For the complicated wavefields, the motion vector varies rapidly, so that a large value of α may be used to smooth the motion vector, particularly for the backward propagated wavefields. Here we use α=1 for all the examples in this disclosure.

Figure 2:
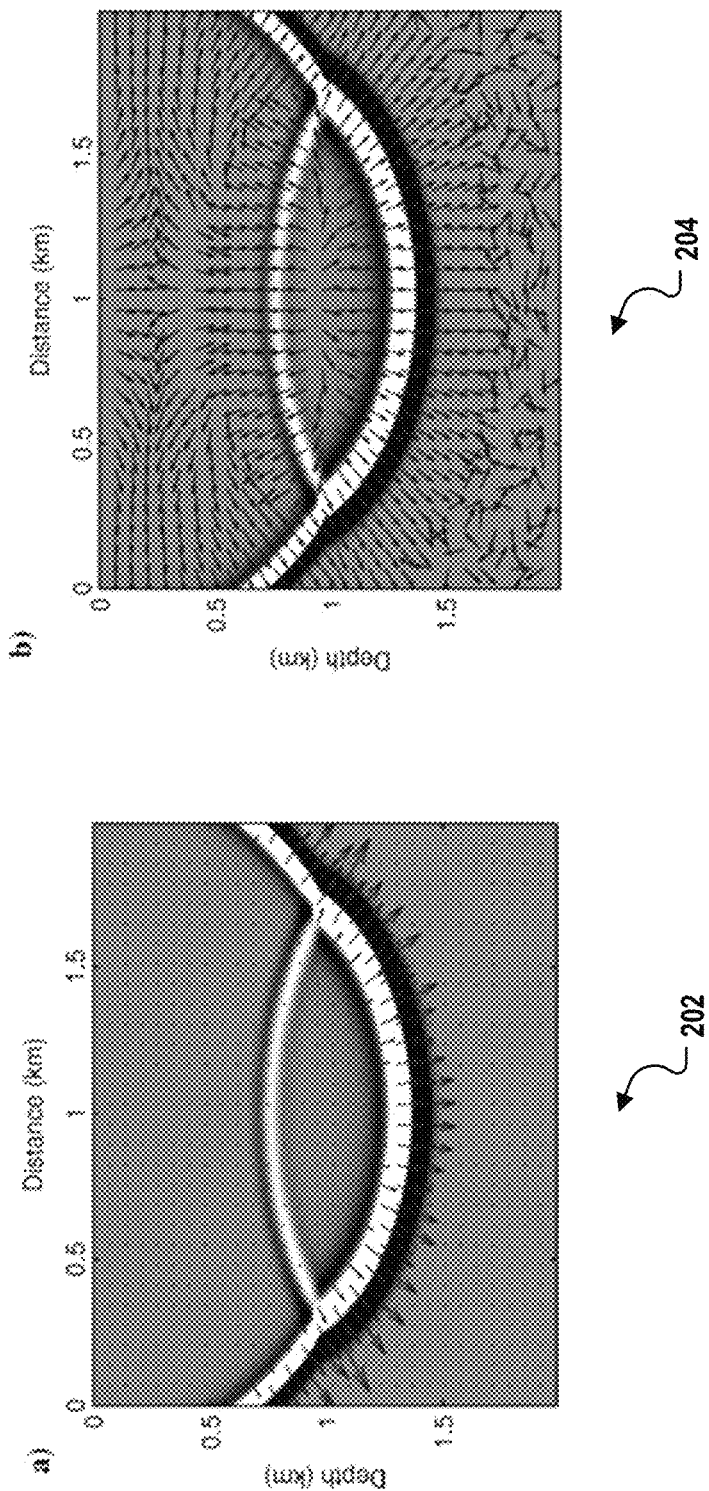
FIG. 2 illustrates example propagation directions according to an implementation.

FIG. 2 illustrates example propagation directions accordingly to an implementation. FIG. 2 includes a schematic diagram 202 that shows propagation directions at one snapshot calculated by the optical flow method. The direction of an arrow indicates the wavefield propagation direction which are orthogonal to the wavefront, and the amplitude of the arrow indicates the speed of the motion along this propagation direction. FIG. 2 also includes a schematic diagram 204 that shows normalized propagation directions obtained based on the calculated propagation directions. The normalized propagation directions can be used to calculate the half opening (reflection) angle and generate ADCIGs.

When the directions of both forward and backward propagated wavefields at each point and time step are calculated using the optical flow method, the half opening angle in the subsurface can be calculated by the following relationship:

$$\cos(2\theta) = \vec{V_s} \cdot \vec{V_r}. \quad (6)$$

Figure 3:
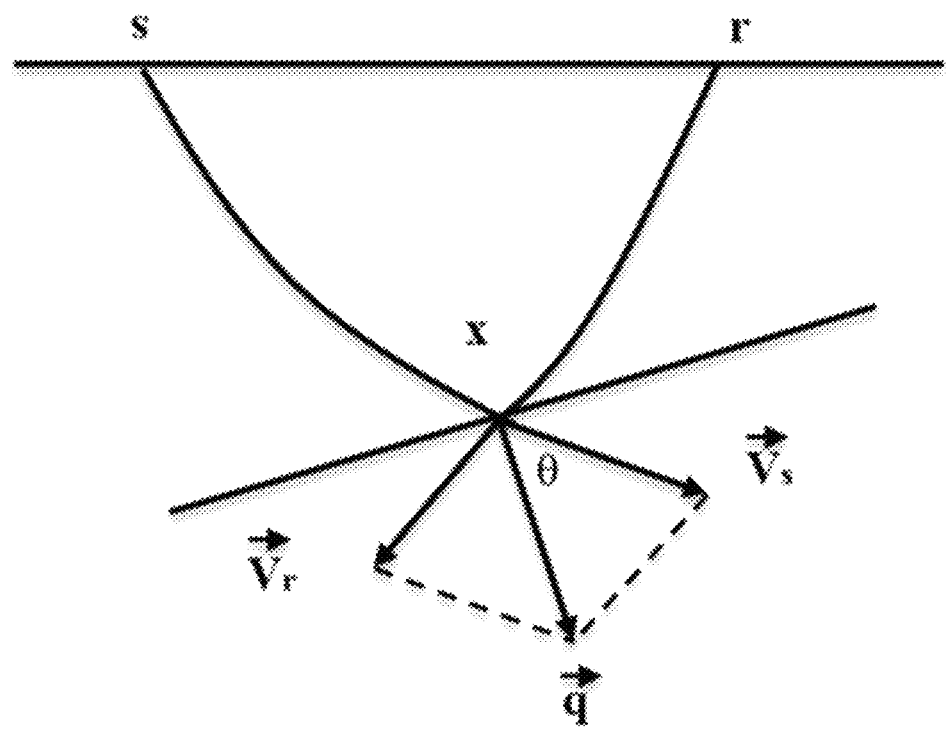
FIG. 3 is a schematic diagram illustrating an example calculation of angle domain image condition according to an implementation.

FIG. 3 is a schematic diagram 300 illustrating an example calculation of angle domain image condition according to an implementation. As shown in FIG. 3, θ represents the half opening angle, $\vec{V_s}$ donates the direction of forward propagated wavefields and $\vec{V_r}$ donates the direction of back propagated wavefields, $\vec{q}$ donates the direction of summation of vectors $\vec{V_s}$ and $\vec{V_r}$. In some cases, $\vec{q}$ is orthogonal with the interface of reflector.

Using image condition I'(x, z, t)=S·R (S and R represent source and receiver wavefields, respectively), the image value can be calculated at each image point and time step in the subsurface, for each shot. Sorting and binning the image by the angle θ calculated from equation 6, obtains the image I'(x, z, θ, t). By making the summation for all time steps and shots, the final ADCIGs I(x, z, θ) can be generated.

In some cases, the optical flow process can be used together with the wavefield separation process to generate better ADCIGs. To avoid calculating the incorrect wavefield direction as discussed in FIG. 1, the wavefields can be separated into up-going and down-going waves. The optical flow process can be applied to only the down-going wave to calculate the direction. To separate the wavefields into different directions, a method based on the Hilbert transform can be used. The up-going and down-going wave can be expressed $$P^{\mp} = \tfrac{1}{2} P \mp \tfrac{1}{2} H_z[H_t(P)]. \quad (7)$$

Here, $H_z$ and $H_t$ denote the Hilbert transform with respect to depth z and time t respectively. The superscript ∓ above P indicates up-going and down-going. Equations (B-1) to (B-10) and associated descriptions provide some additional details of the derivation and implementation of the Equation 7.

We denote the wavefield by P(z, t), where the horizontal coordinate is omitted for notation simplicity. The Fourier transform of wavefield with respect to depth z and time t is expressed as $\tilde{P}$. $\tilde{P}$ can be separated to the up-going ($\tilde{P}^-$) wave and down-going wave ($\tilde{P}^+$). The up-going $\tilde{P}^-$ and down-going $\tilde{P}^+$ waves in frequency ω and wavenumber $k_z$ domain can be expressed as following $$\tilde{P}^- = \begin{cases} \tilde{P}(k_z, \omega), & \omega k_z \leq 0 \\ 0, & \text{otherwise} \end{cases}, \quad (B\text{-}1)$$

$$\tilde{P}^+ = \begin{cases} \tilde{P}(k_z, \omega), & \omega k_z \geq 0 \\ 0, & \text{otherwise} \end{cases}. \quad (B\text{-}2)$$

For a given wavefield P(t) (omitting the position coordinates), its Fourier transform (F) with respect to time and Hilbert transform (H) would have the relationship as $$F_t\{H_t[P(t)]\} = -i\,\text{sgn}(\omega) F_t[P(t)]. \quad (B\text{-}3)$$

Where sgn(ω) denotes the sign function. We define the extended Hilbert transform (E) as $$E_t^-[P(t)] = P(t) - iH_t[P(t)], \quad (B\text{-}4)$$

$$E_t^+[P(t)] = P(t) + iH_t[P(t)]. \quad (B\text{-}5)$$

The superscript (−, +) of E represent the non-positive and positive components in the frequency domain. The subscript t under F, H, and E indicates the variable time on which the operators are applied. The extended Hilbert transform of wavefield is a complex wavefield. Its real part is the original wavefield and the imaginary part is the Hilbert transform of the original wavefield. Appling the Fourier transform to equation (B-4) and (B-5), we can get the following expressions:

$$F_t\{E_t^-[P(t)]\} = \begin{cases} 0, & \omega \geq 0 \\ 2\tilde{P}(\omega), & \omega < 0 \end{cases}, \quad (B\text{-}6)$$

$$F_t\{E_t^+[P(t)]\} = \begin{cases} 2\tilde{P}(\omega), & \omega \geq 0 \\ 0, & \omega < 0 \end{cases}. \quad (B\text{-}7)$$

According to equation (B-6) and (B-7), equation (B-4) and (B-5) give none-zero value for the negative and positive frequency respectively. Considering equations (B-1), (B-2), (B-4)-(B-7) and also using extended Hilbert transform with respect to depth, the up-going $P^-$ and down-going $P^+$ waves can be formulated in the time and depth domain as $$P^- = \tfrac{1}{4}\{E_z^+[E_t^-(P)] + E_z^-[E_t^+(P)]\} = \tfrac{1}{2} P(z,t) + \tfrac{1}{2} H_z\{H_t[P(z,t)]\}, \quad (B\text{-}8)$$

$$P^+ = \tfrac{1}{4}\{E_z^+[E_t^+(P)] + E_z^-[E_t^-(P)]\} = \tfrac{1}{2} P(z,t) - \tfrac{1}{2} H_z\{H_t[P(z,t)]\}. \quad (B\text{-}9)$$

In the conventional method of wavefield separation, the entire wavefields at all time steps are needed for the Hilbert transform with respect to time ($H_t[P(z, t)]$), which may be impractical because of the large storage requirement and the low computational efficiency. To overcome this problem, consider the wave equation with Hilbert transform as $$\Delta H_t(P) = \frac{1}{v} \frac{\partial^2 H_t(P)}{\partial t^2} + H_t[f(t)]. \tag{B-10}$$

Where, $$\Delta = \frac{\partial^2}{\partial x^2} + \frac{\partial^2}{\partial z^2},$$

v is the velocity model and $f(t)$ is the source function. Instead of using original source $f(t)$, propagating Hilbert transformed source $H_t[f(t)]$ can directly get the Hilbert transformed wavefield $H_t(P)$ without saving the entire wavefield at all time steps. This approach for separating up-going and down-going waves can be summarized as the following steps:
1. Calculate the wavefield P by wave equation using the original source data.
2. Generate the wavefield $H_t(P)$ by wave equation using the Hilbert transform of the original source data. This new wavefield is the Hilbert transform of the wavefield calculated from step 1.
3. Implement the Hilbert transform of the wavefield from step 2 with respect to depth.
4. Combine the wavefields from step 1 and step 3 to obtain the up-going and down-going waves.

By replacing the depth z to any given direction, for example, left or right, in equation (B-8) and (B-9), we can separate the wavefield into the given direction.

In this way, saving the entire wavefield is not required, which significantly improves the efficiency. Likewise, decomposing receiver wavefields can be similarly obtained by replacing the source function with the receiver data. In some cases, in order to further save the computational cost, only the receiver wavefield is decomposed because the direct wave and reflection wave from the source signal may not meet at the same location and time very often.

Figure 4:
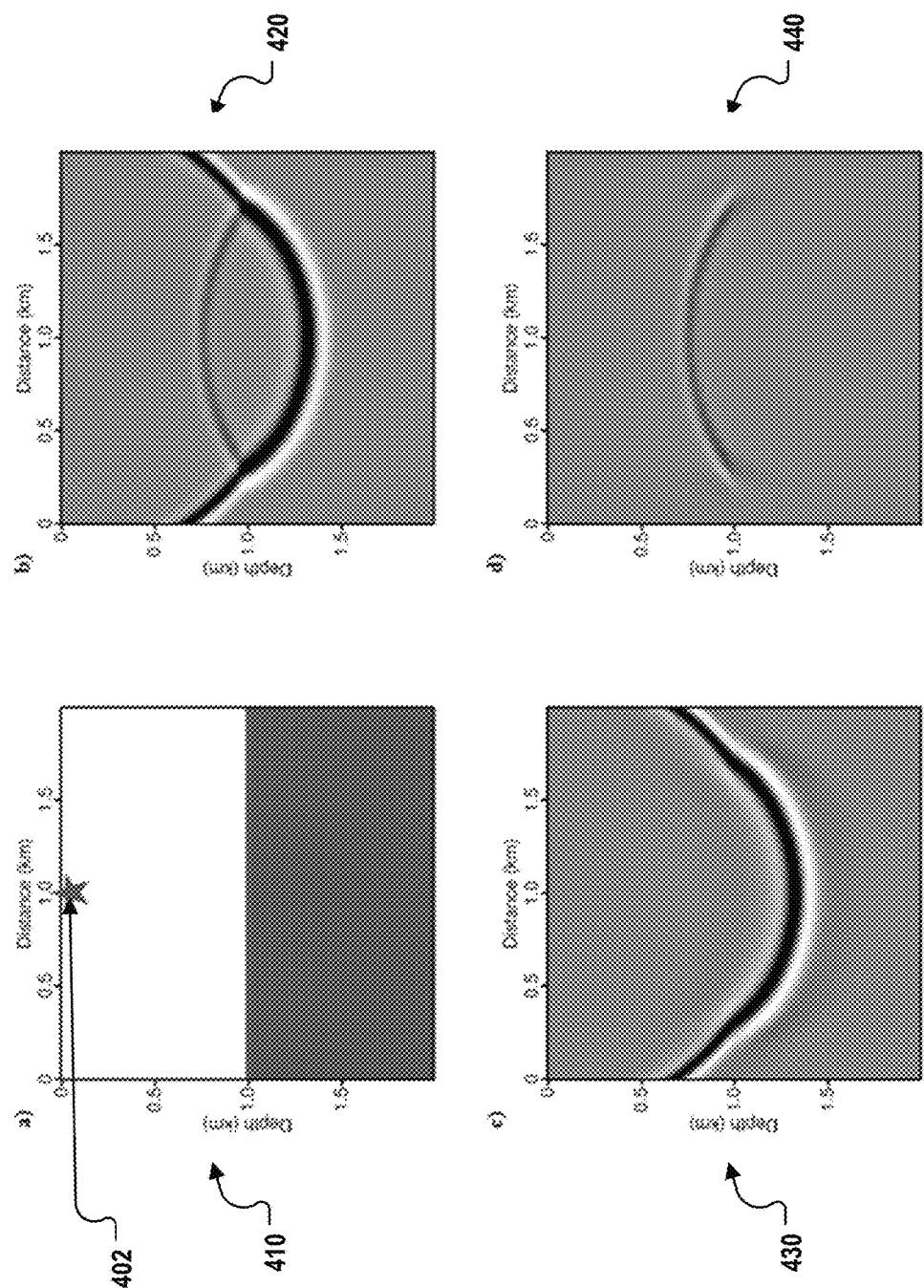
FIG. 4 illustrates example velocity models according to an implementation.

FIG. 4 illustrates example velocity models according to an implementation. FIG. 4 includes a schematic diagram 410 illustrating an example two-layer velocity model. The source location 402 is denoted with a star at the middle of the surface. The schematic diagram 420 illustrates a seismic wavefield snapshot at 0.7 s, generated by finite-difference modeling of the acoustic wave equation. To gain its Hilbert transformed wavefields with respect to time, according to equation B-10, an imaginary source can be generated using Hilbert transform of the original source with respect to time, and the imaginary source can be propagated using the same wave equation propagator as for the original source.

By doing so, all the snapshots generated from the original source may not need to be saved, because the Hilbert transformed wavefields $H_t(P)$ from the all-time wavefield P may not need to be computed. After getting $H_t(P)$ by solving Equation (B-10), applying the Hilbert transform with respect to depth and combining with the wavefields from the original source according to Equation (7), the wavefields can be separated into up-going and down-going waves, according to equation 7. The schematic diagrams 430 and 440 show the separated the down-going wave and up-going waves, respectively. Moreover, the left-going waves and the right-going waves can also be separated using similar approaches, for example, replacing the depth direction Hilbert transform with a horizontal direction (x-axis) transform and applying the Hilbert transform row by row instead of column by column.

FIG. 5 illustrates an example angle domain common imaging gather generating process 500 using the wavefield separation algorithm according to an implementation. For clarity of presentation, the description that follows generally describes process 500 in the context of FIGS. 1-4 and 6-10. However, it will be understood that process 500 may be performed, for example, by any other suitable system, environment, software, and hardware, or a combination of systems, environments, software, and hardware, as appropriate. In some cases, the process 500 can be executed on a large scale computer clusters, super computers, or any other computing device or collection of computing devices. In some implementations, various steps of process 500 can be run in parallel, in combination, in loops, and/or in any order.

At 502, a set of seismic data associated with a subsurface region is received at a data processing apparatus. The set of seismic data includes receiver signal data at a plurality of time steps. In some cases, the set of seismic data also includes source signal data at the plurality of time steps. In some cases, source signal data include recordings of the source wavelets generated by the source device. Alternatively or in combination, source signal data can include computer-generated source excitation using mathematical functions, for example, Ricker wavelet functions, or other simulations and approximations of the source signal.

The receiver signal data include time-domain signal data acquired at the subsurface region. In some cases, during seismic data acquisition, a source (dynamite, vibratory truck, airgun array and etc.) is activated and the reflections/refractions/transmissions from the subsurface geological boundaries are recorded by the receiver devices which are located on the surface of the Earth. This type of acquisition is repeated for each shot, sequentially or simultaneously, until all the seismic data have been acquired for this survey area. These acquired seismic data are included in the receiver signal data. In some cases, the acquired seismic data are collected in the field, transferred to an office (stored and transported via a computer network, a physical network, or a combination thereof), and used as inputs to a computing device executing the process 500.

At 504, for each time step in the plurality of time steps, a backward propagated receiver wavefield is calculated based on the receiver signal data at the respective time step. A forward propagated source wavefield is also calculated based on the source signal at the respective time step. Both of receiver and source wavefield calculating use equation 8, $$\Delta P = \frac{1}{v} \frac{\partial^2 P}{\partial t^2} + f(t), \tag{8}$$

where f(t) is receiver signal data for calculating backward propagated receiver wavefield and f(t) is source signal for calculating propagated source wavefield.

At 506, a first direction receiver wave and a second direction receiver wave of the receiver wavefield are separated by the data processing apparatus using a Hilbert transformation of the receiver signal data at the respective time step. In some cases, the first direction receiver wave is a down-going receiver wave and the second direction receiver wave is an up-going receiver wave. Alternatively, the first direction receiver wave and the second direction receiver wave are left-going and right-going receiver waves, respectively.

In some cases, as discussed previously with respect to equation (B-10) and associated descriptions, for each time step, the separation can be performed by generating a Hilbert transformation of the receiver signal data at the each time step. The Hilbert transformation of the receiver signal data can be used as input to calculate a Hilbert transformation of the receiver wavefield with respect to time, using the same function as 504. A Hilbert transformation with respect to depth is performed on the calculated Hilbert transformation of the receiver wavefield with respect to time. As discussed previously with respect to equation (7) and associated descriptions, the Hilbert transformation with respect to depth and the receiver wavefield calculated at 504 are used to separate the up-going waves and the down-going waves. In some cases, a Hilbert transformation with respect to a different direction, for example, left or right, can be performed on the calculated Hilbert transformation of the receiver wavefield with respect to time to separate the receiver wavefield into direction receiver waves along the different direction.

In some cases, source wavefields can be generated and separated into first direction source waves and second direction source waves using approaches similar to the receiver wavefields. Alternatively, the source wavefields can be processed without separating into different directions.

At 508, an optical flow process is applied to the first direction receiver waves to calculate wavefield directions. In some cases, the first direction is a down-going direction. Using only the down-going direction waves can avoid interference issues and generate better ACCIGs. b.

At 510, ADCIGs are generated based on the wavefield directions. In some cases, as discussed previously with respect to equation (6) and associated descriptions, a half opening angle can be calculated based on the wavefield directions. The ADCIGs can be generated by binning and summing images based on the half opening angle. Subsurface image can be generated by summing the ADCIGs with respect to the half opening angle.

In some cases, the produced ADCIGs can be outputted on a user interface for analysis. Alternatively or in combination, the produced ADCIGs can be transmitted over a network to one or more locations for storing, analyzing, further processing, or any combinations thereof. The produced depth subsurface image and AVA analysis based on ADCIGs can indicate whether there is a potential trap, structure, or a combination thereof for hydrocarbon accumulation. Moreover, they can be used as a guide for drilling engineers to optimally place and locate their well trajectories to the prospective hydrocarbon reservoir.

Figure 7:
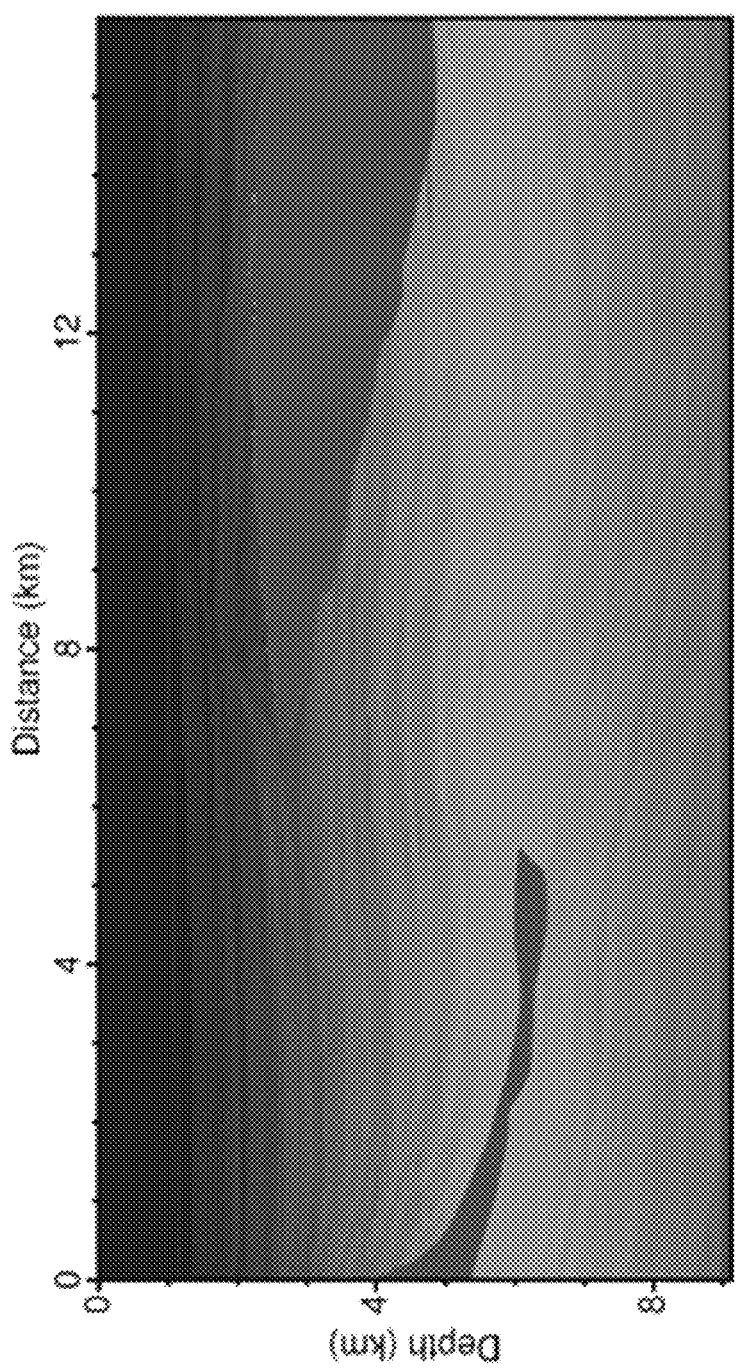
FIG. 7 illustrates a portion of a Pluto salt velocity model with a gently varying background velocity accordingly to an implementation

FIG. 7 illustrates a portion of a Pluto salt velocity model with a gently varying background velocity accordingly to an implementation. The horizontal and depth interval of the model is 10 m. 450 synthetic streamer shot gathers are generated with shot interval of 40 m, receiver interval of 20 m, and the maximum offset of 8 km.

Figure 8:
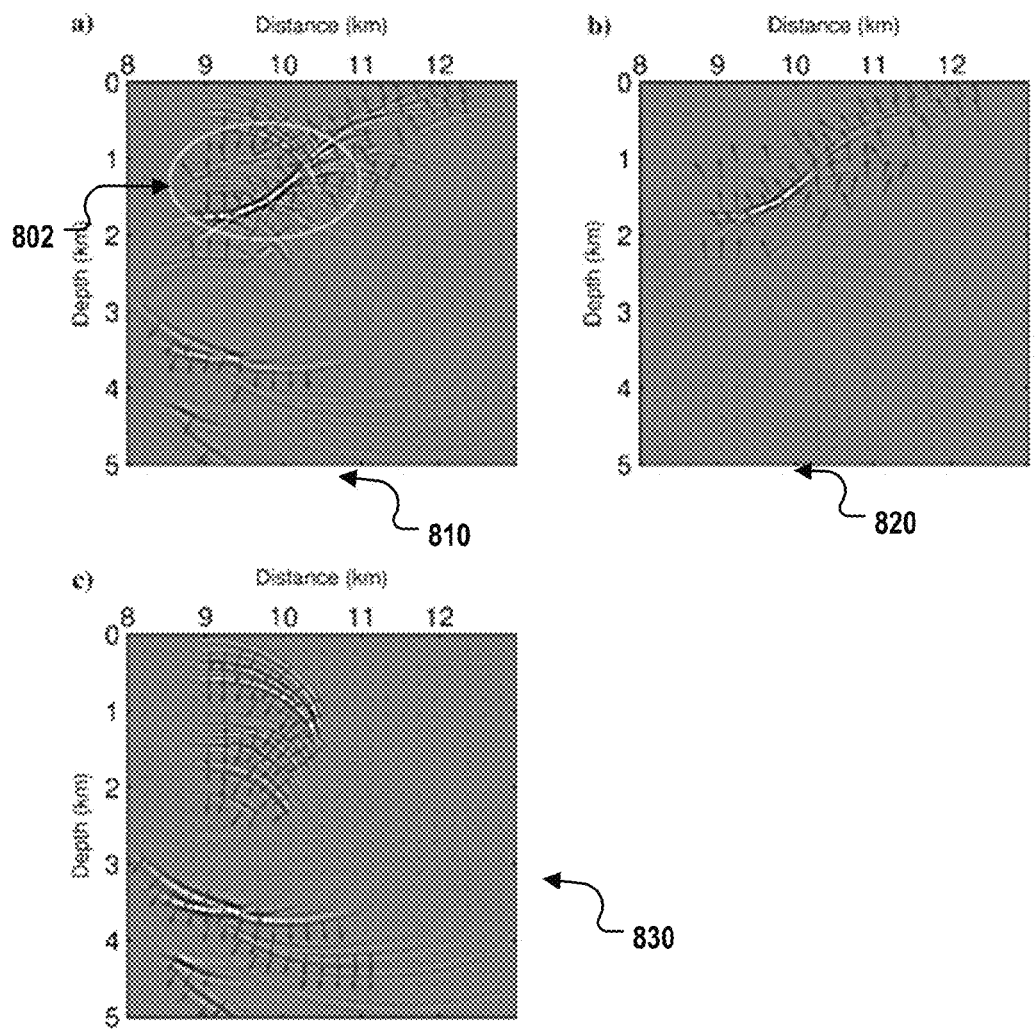
FIG. 8 illustrates a comparison of propagation direction calculations according to an implementation.

FIG. 8 illustrates a comparison of propagation direction calculations according to an implementation. FIG. 8 includes an image 810, generated without wavefield separation, and images 820, and 830 generated based on wavefield separation. Image 810 shows the back-propagated receiver wavefield at 1.2 s. The direct back-propagated wave and the reflected back-propagated wave arrive at the same time in the region above the top of salt. Inside the circled area 802, the weak event represents the direct back-propagated wave of receiver wavefield and the strong event represents the reflected back-propagated wave of receiver wavefield. Using the conventional method, without wavefield separation, the propagation directions are calculated using the optical flow method as shown in the image 810, where the arrow denotes the propagation direction of wavefield. As seen inside the circled area 802, the wave propagation directions include both up-going and down-going, which are incorrect for calculating the reflection angle. Images 820 and 830 illustrate the up-going waves and down-going waves, respectively. Only the down-going waves in the image 830 are used to calculate the propagation direction of the wavefield. The arrows in image 830 show the correct down-going direction that can be used for computing the angle gather.

Figure 9:
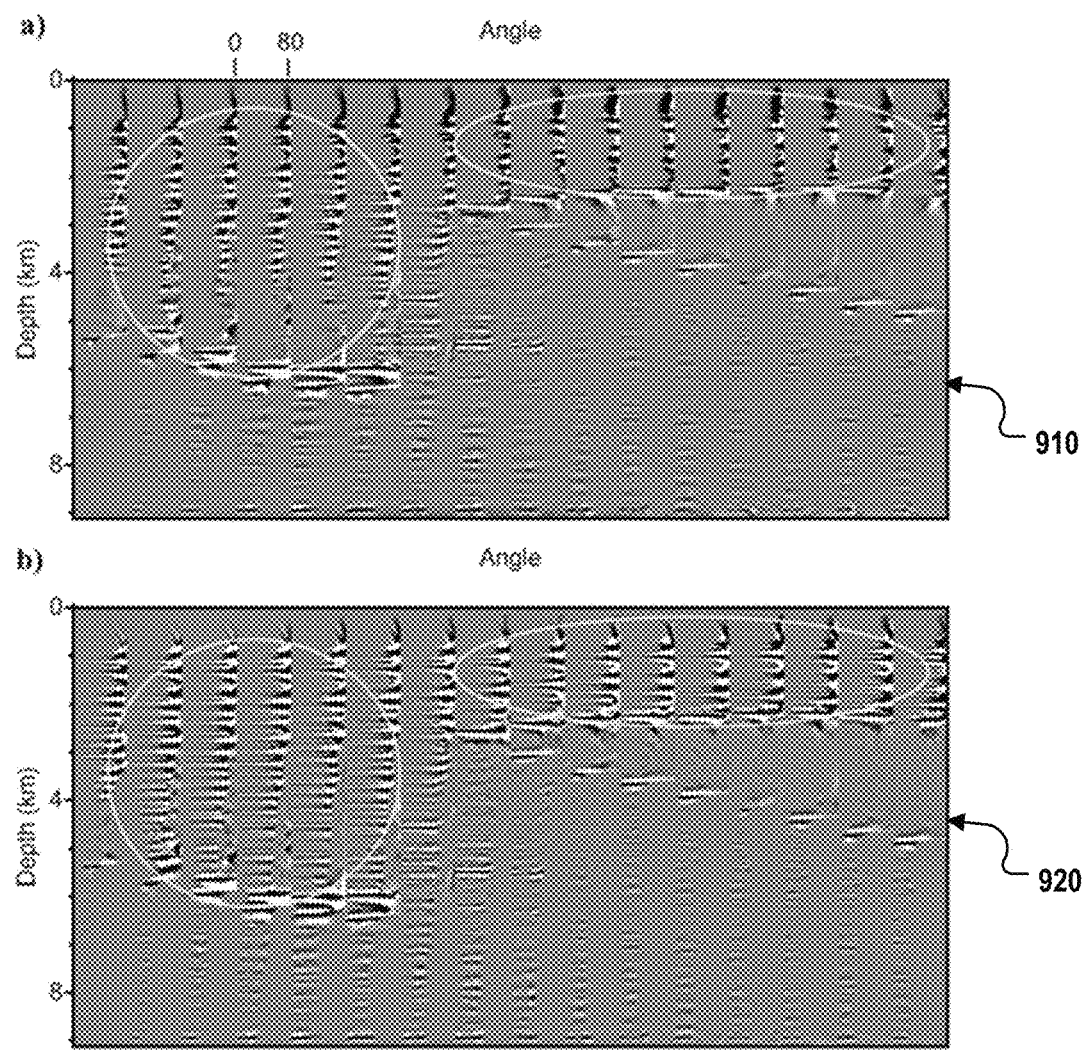
FIG. 9 illustrates a comparison of angle gathers generated without and with wavefield separation according to an implementation
Figure 10:
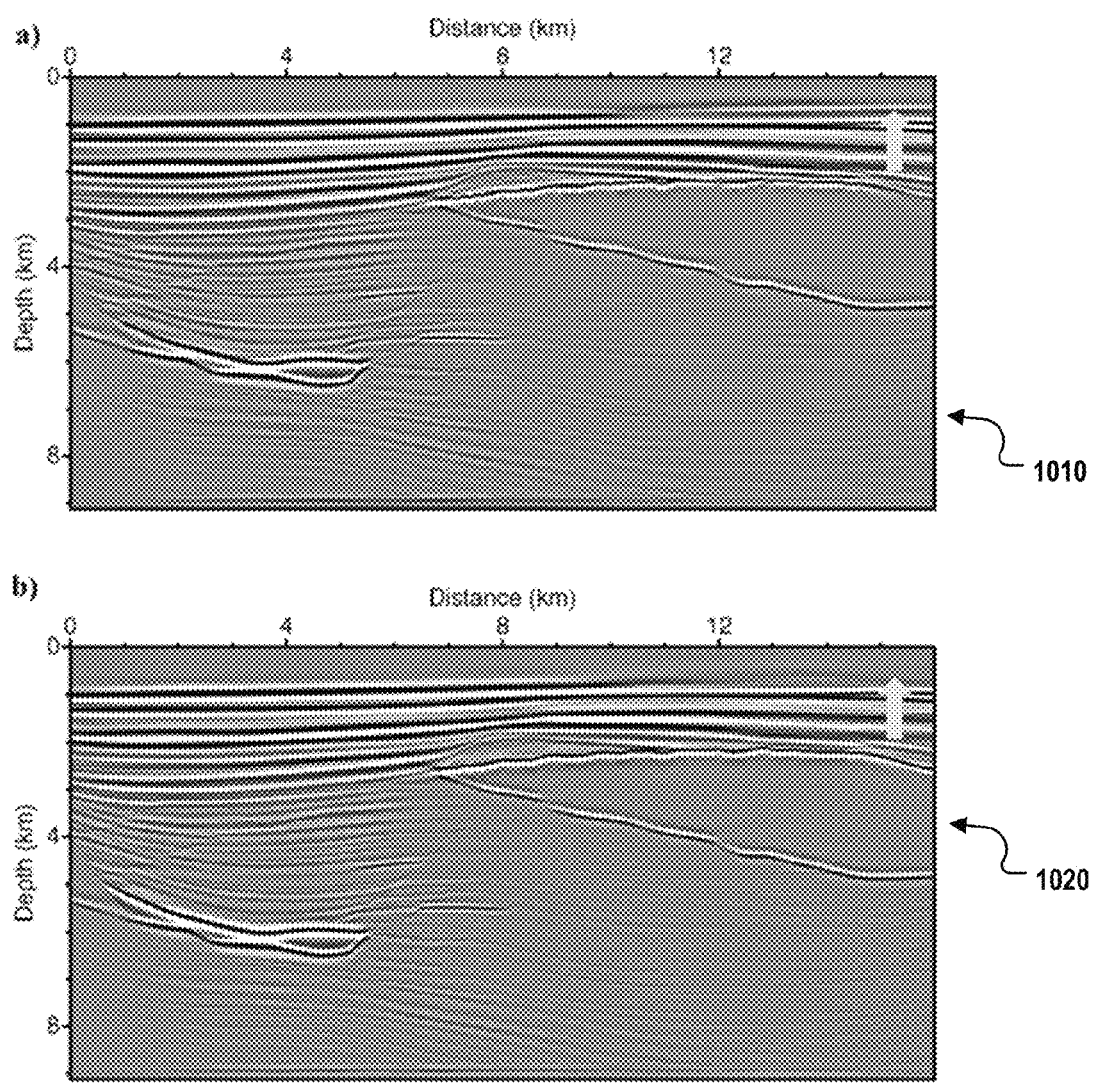
FIG. 10 illustrates a comparison of stacked images generated without and with wavefield separation according to an implementation Like reference numbers and designations in the various drawings indicate like elements.

FIG. 9 illustrates a comparison of ADCIGs generated without and with wavefield separation according to an implementation. FIG. 9 includes an ADCIG 910, representing the angle gathers generated without wavefield separation. Because of the wrong direction of the back-propagated wavefield, most of the energy above the top of salt is binned into the large angle. The small angle severely misses the energy information, which makes it hard to pick the moveout for velocity analysis. FIG. 9 also includes an ADCIG 920, representing the angle gathers generated with wavefield separation. After wavefield separation and keeping only down-going wave for calculating the direction, and for making the imaged traces in ADCIGs, the energy above the top of salt is correctly binned into the small angle. FIG. 10 illustrates a comparison of stacked images generated without and with wavefield separation according to an implementation. FIG. 10 includes images 1010 and 1020, representing corresponding stacked images generated without and with wavefield separation, respectively. Compared to the image 1010 generated without wavefield separation, the image 1020 removes the false images formed from the cross-correlation of up-going source and receiver wavefields.

Figure 6:
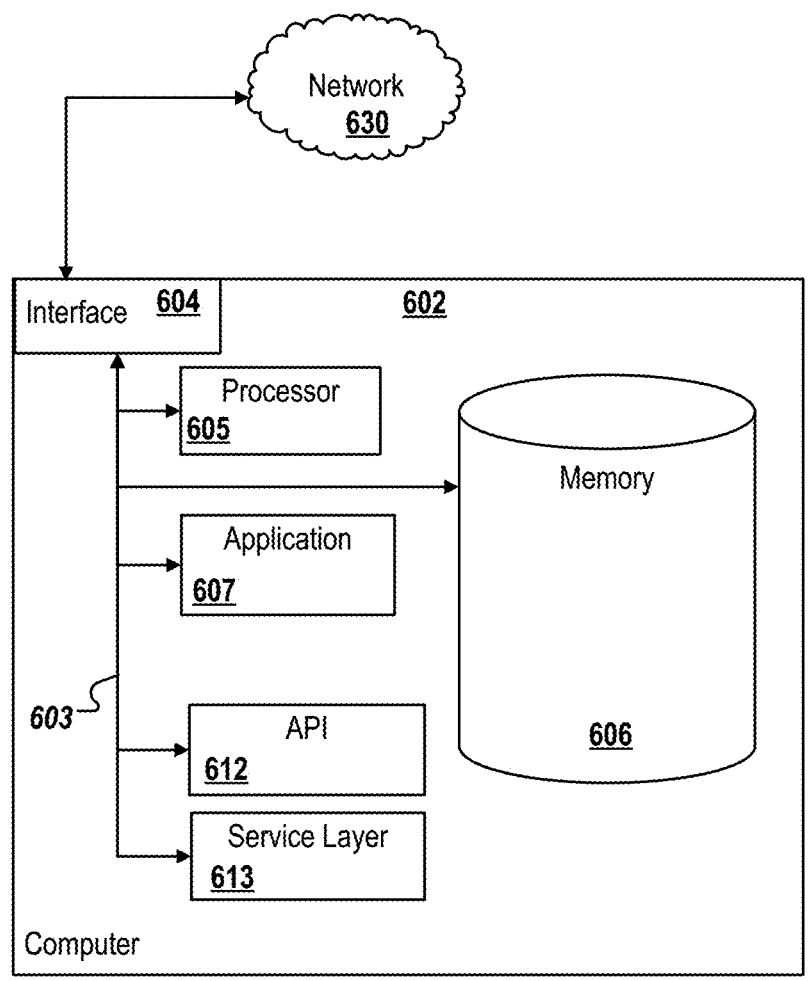
FIG. 6 is a high level architecture block diagram of a geophysical imaging system according to an implementation

FIG. 6 is a high level architecture block diagram of a geophysical imaging system according to an implementation. At a high level, the illustrated system 600 includes a geophysical image processing computer 602 coupled with a network 630. The described illustration is only one possible implementation of the described subject matter and is not intended to limit the disclosure to the single described implementation. Those of ordinary skill in the art will appreciate the fact that the described components can be connected, combined, and/or used in alternative ways, consistent with this disclosure.

The network 630 facilitates communication between the computer 602 and other components, for example, components that obtain observed data for a location and transmit the observed data to the computer 602. The network 630 can be a wireless or a wireline network. The network 630 can also be a memory pipe, a hardware connection, or any internal or external communication paths between the components.

The computer 602 includes a computing system configured to perform the method as described herein. In some cases, the algorithm of the method can be implemented in an executable computing code, e.g., C/C++ executable codes. In some cases, the computer 602 can include a standalone Linux system that runs batch applications. In some cases, the computer 602 can include mobile or personal computers that have sufficient memory size to process each block of the geophysical data.

The computer 602 may comprise a computer that includes an input device, such as a keypad, keyboard, touch screen, microphone, speech recognition device, other devices that can accept user information, and/or an output device that conveys information associated with the operation of the computer 602, including digital data, visual and/or audio information, or a GUI.

The computer 602 can serve as a client, network component, a server, a database, or other persistency, and/or any other component of the system 600. In some implementations, one or more components of the computer 602 may be configured to operate within a cloud-computing-based environment.

At a high level, the computer 602 is an electronic computing device operable to receive, transmit, process, store, or manage data and information associated with the system 600. According to some implementations, the computer 602 may also include, or be communicably coupled with, an application server, e-mail server, web server, caching server, streaming data server, business intelligence (BI) server, and/or other server.

The computer 602 can receive requests over network 630 from a client application (e.g., executing on another computer 602) and respond to the received requests by processing said requests in an appropriate software application. In addition, requests may also be sent to the computer 602 from internal users (e.g., from a command console or by another appropriate access method), external or third parties, other automated applications, as well as any other appropriate entities, individuals, systems, or computers.

Each of the components of the computer 602 can communicate using a system bus 603. In some implementations, any and/or all the components of the computer 602, both hardware and/or software, may interface with each other and/or the interface 604, over the system bus 603, using an application programming interface (API) 612 and/or a service layer 613. The API 612 may include specifications for routines, data structures, and object classes. The API 612 may be either computer language-independent or -dependent and refer to a complete interface, a single function, or even a set of APIs. The service layer 613 provides software services to the computer 602 and/or the system 600. The functionality of the computer 602 may be accessible for all service consumers using this service layer. Software services, such as those provided by the service layer 613, provide reusable, defined business functionalities, through a defined interface. For example, the interface may be software written in JAVA, C++, or other suitable language providing data in Extensible Markup Language (XML) format or other suitable format. While illustrated as an integrated component of the computer 602, alternative implementations may illustrate the API 612 and/or the service layer 613 as stand-alone components in relation to other components of the computer 602 and/or system 600. Moreover, any or all parts of the API 612 and/or the service layer 613 may be implemented as child or sub-modules of another software module, enterprise application, or hardware module, without departing from the scope of this disclosure.

The computer 602 includes an interface 604. Although illustrated as a single interface 604 in FIG. 6, two or more interfaces 604 may be used according to particular needs, desires, or particular implementations of the computer 602 and/or system 600. The interface 604 is used by the computer 602 for communicating with other systems in a distributed environment—including within the system 600—connected to the network 630 (whether illustrated or not). Generally, the interface 604 comprises logic encoded in software and/or hardware in a suitable combination and operable to communicate with the network 630. More specifically, the interface 604 may comprise software supporting one or more communication protocols associated with communications such that the network 630 or interface's hardware is operable to communicate physical signals within and outside of the illustrated system 600.

The computer 602 includes a processor 605. Although illustrated as a single processor 605 in FIG. 6, two or more processors may be used according to particular needs, desires, or particular implementations of the computer 602 and/or the system 600. Generally, the processor 605 executes instructions and manipulates data to perform the operations of the computer 602. Specifically, the processor 605 executes the functionality required for processing geophysical data.

The computer 602 also includes a memory 606 that holds data for the computer 602 and/or other components of the system 600. Although illustrated as a single memory 606 in FIG. 6, two or more memories may be used according to particular needs, desires, or particular implementations of the computer 602 and/or the system 600. While memory 606 is illustrated as an integral component of the computer 602, in alternative implementations, memory 606 can be external to the computer 602 and/or the system 600.

The application 607 is an algorithmic software engine providing functionality according to particular needs, desires, or particular implementations of the computer 602 and/or the system 600, particularly with respect to functionality required for processing geophysical data. For example, application 607 can serve as one or more components/applications described in FIGS. 1-5 and 7-10. Further, although illustrated as a single application 607, the application 607 may be implemented as multiple applications 607, on the computer 602. In addition, although illustrated as integral to the computer 602, in alternative implementations, the application 607 can be external to the computer 602 and/or the system 600.

There may be any number of computers 602 associated with, or external to, the system 600 and communicating over network 630. Further, the terms "client," "user," and other appropriate terminology may be used interchangeably, as appropriate, without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method for generating subsurface common image gathers, comprising:
    receiving, at a data processing apparatus, a set of seismic data associated with a subsurface region, wherein the set of seismic data includes receiver signal data at a plurality of time steps;
    for each time step in the plurality of time steps:
        calculating, by the data processing apparatus, a receiver wavefield based on the receiver signal data at the respective time step;
        separating, by the data processing apparatus, a first direction receiver wavefield and a second direction receiver wavefield of the receiver wavefield using Hilbert transformation of the receiver signal data at the respective time step; and
        applying, by the data processing apparatus, an optical flow process on the first direction receiver wavefield to calculate wavefield directions;
    generating, by the data processing apparatus, an Angle Domain Common Image Gather (ADCIG) based on the wavefield directions; and
    analyzing the ADCIG to determine at least one of a trap or a structure of hydrocarbon accumulation in the subsurface region.

2. The method of claim 1, wherein the first direction receiver wavefield is down-going and the second direction receiver wavefield is up-going.

3. The method of claim 1, wherein the first direction receiver wavefield is at least one of left-going or right-going.

4. The method of claim 1, wherein the set of seismic data further includes source signal data at the plurality of time steps, the method further comprising:
    for each time step in the plurality of time steps:
        calculating, by the data processing apparatus, a source wavefield based on the source signal data at the respective time step;
        separating, by the data processing apparatus, a first direction source wavefield and a second direction source wavefield of the source wavefield using Hilbert transformation of the source signal data at the respective time step; and applying, by the data processing apparatus, a second optical flow process on the first direction source wavefield to calculate source wavefield directions; and wherein the ADCIG is generated further based on the source wavefield directions.

5. The method of claim 1, wherein generating the ADCIG comprises:

calculating a half opening angle based on the wavefield directions; and generating the ADCIG by binning and summing images based on the half opening angle.

6. The method of claim 1, wherein separating the first direction receiver wavefield and the second direction receiver wavefield comprises solving $H_t(P)$ based on an equation:

$$\Delta H_t(P) = \frac{1}{v} \frac{\partial^2 H_t(P)}{\partial t^2} + H_t[f(t)],$$

wherein P represents the receiver wavefield, $H_t(P)$ represents a Hilbert transform of the receiver wavefield, v represents a velocity model, t represents a time step, and $f(t)$ represents a source function.

7. The method of claim 1, further comprising: generating a seismic image based on the ADCIG.

* * * * *